Nov. 3, 1925.

W. McNAMARA

FURNACE FEED DEVICE

Filed Dec. 5, 1923    2 Sheets-Sheet 1

1,560,070

INVENTOR
William McNamara
BY George Ramsey
his ATTORNEY

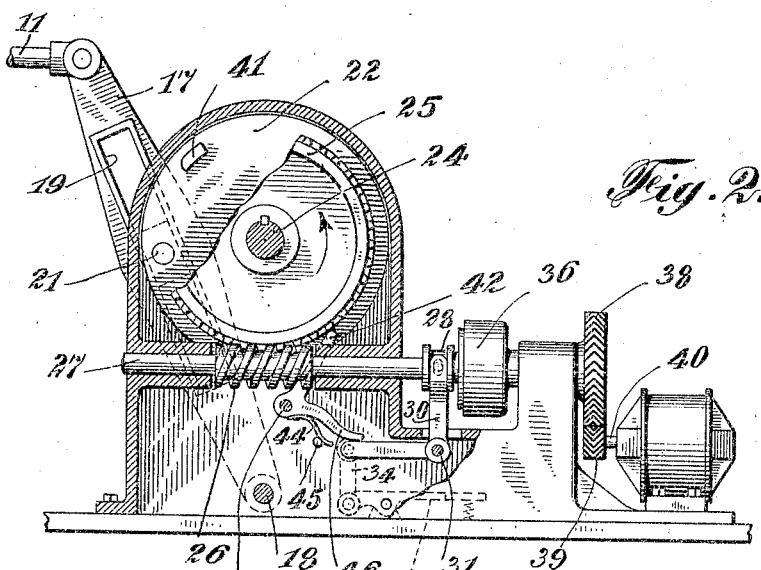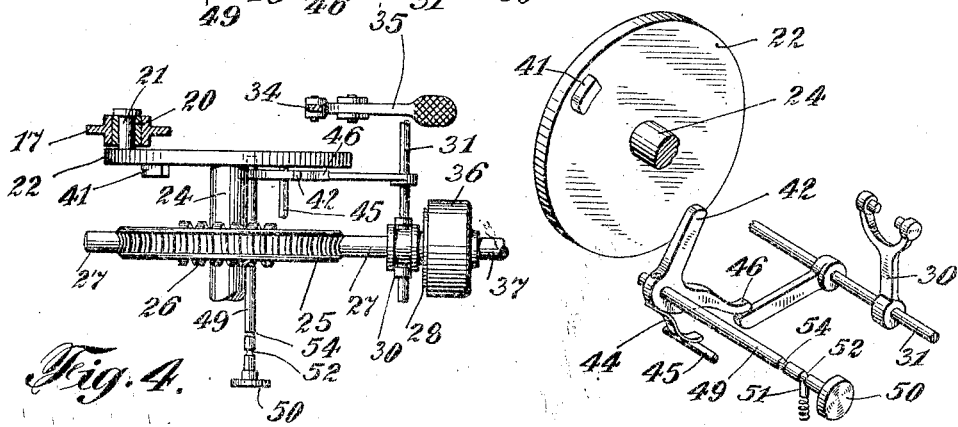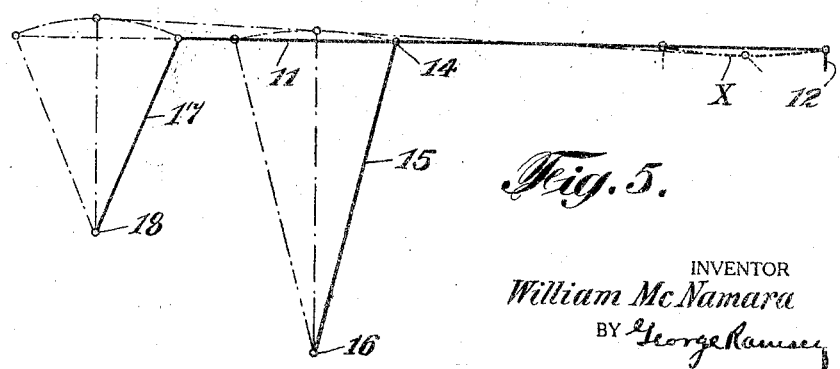

Patented Nov. 3, 1925.

1,560,070

UNITED STATES PATENT OFFICE.

WILLIAM McNAMARA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

FURNACE FEED DEVICE.

Application filed December 5, 1923. Serial No. 678,583.

*To all whom it may concern:*

Be it known that I, WILLIAM McNAMARA, a citizen of the United States, residing in Connellsville, in the county of Fayette, State of Pennsylvania, have invented certain new and useful Improvements in Furnace Feed Devices, of which the following is a specification.

This invention relates broadly to charging devices for furnaces and more especially to a mechanism for mechanically serving a glass tank or furnace with materials to be melted in the tank.

Glass furnaces in the art for the purposes of explaining this invention, may be divided into two general classes, namely, day tanks, or furnaces, and continuous tanks, or furnaces. In the day tank the materials to be melted are placed in the furnace and are subjected to a melting heat for a sufficient length of time to completely fuse together the materials to make glass, commonly referred to in the art as the "batch," and then the glass formed by the melting of the batch is worked out of the tank. The tank is permitted to cool and the operation is repeated. In the continuous tank the construction is such that the furnace proper is divided into two chambers, the first comprising the melting chamber, and the second, which is connected to the first by means of a narrow passageway called the throat, is the refining chamber or the part of the furnace in which the materials are subjected to a melting heat for a relatively long period of time to uniformly melt the mass.

The remote end of the melting tank, namely, the melting chamber, is adapted to be served from time to time with the batch of a mixture of materials which comprise the glass when these materials are fused to form a plastic mass in the tank. In the continuous tanks the glass in a plastic state flows by gravity from the melting chamber into the refining chamber and the level of glass in the two chambers is substantially the same.

The plastic glass is taken from the refining chamber and manufactured into commercial articles. The process is a continuous one and the tank may run for many months without the operation being stopped. In this continuous operation it is desirable that the level of glass in the tank shall be maintained substantially constant or within very narrow limits. This means that raw material must be fed into the melting chamber at substantially the same rate that the plastic glass is removed from the refining chamber. In very large furnaces the material passing through the furnace may run into several hundred tons per day. The labor of serving such a large amount of material to the tank becomes an important factor. Heretofore in the art this has been done by hand labor, which is usually not high class labor, and therefore is not apt to be performed with the regularity which is necessary for the proper operation of the furnace.

The present invention provides mechanical devices which operate to charge the furnace with the batch by pushing the batch exactly the right distance into the chamber. The operation is a simple one and is performed mechanically without substantial manual effort and the charge is fed to the furnace at the proper time so that the operations of the furnace will be carried on in such manner as to produce the best results. This charging mechanism comprises a mechanically driven charging head or scraper which is driven forward by suitable mechanism with a movement which carries the batch into the furnace in the most expeditious manner.

The principal object of the present invention is an improved device for serving raw materials to a continuous glass tank by pushing accumulated masses of materials into the furnace.

Another object of the present invention is a mechanical device for pushing the batch into the glass furnace by causing an inward and downward pressure on the batch during the feeding operation.

Another object of the invention is to provide a device for mechanically feeding glass furnaces or the like which may be set in operation and will automatically cease to function after a predetermined amount of operation.

Other and further objects of the present invention will in part be obvious and will in part be pointed out hereinafter in the specification following by reference to the accompanying drawings, throughout the several figures of which like parts are designated by like character.

It is recognized that the present invention may be embodied in structures other than those herein specifically disclosed, therefore it is desired that the present disclosure shall be considered as illustrative and not in the limiting sense.

Figure 2 is an elevational view of a portion of the driving mechanism;

Figure 3 is a view illustrating a detail of the mechanism for releasing the clutch.

Figure 4 is a detail plan view of a portion of the driving mechanism;

Figure 5 is a diagrammatic view illustrating the path of movement of the batch serving scraper.

Figure 1:
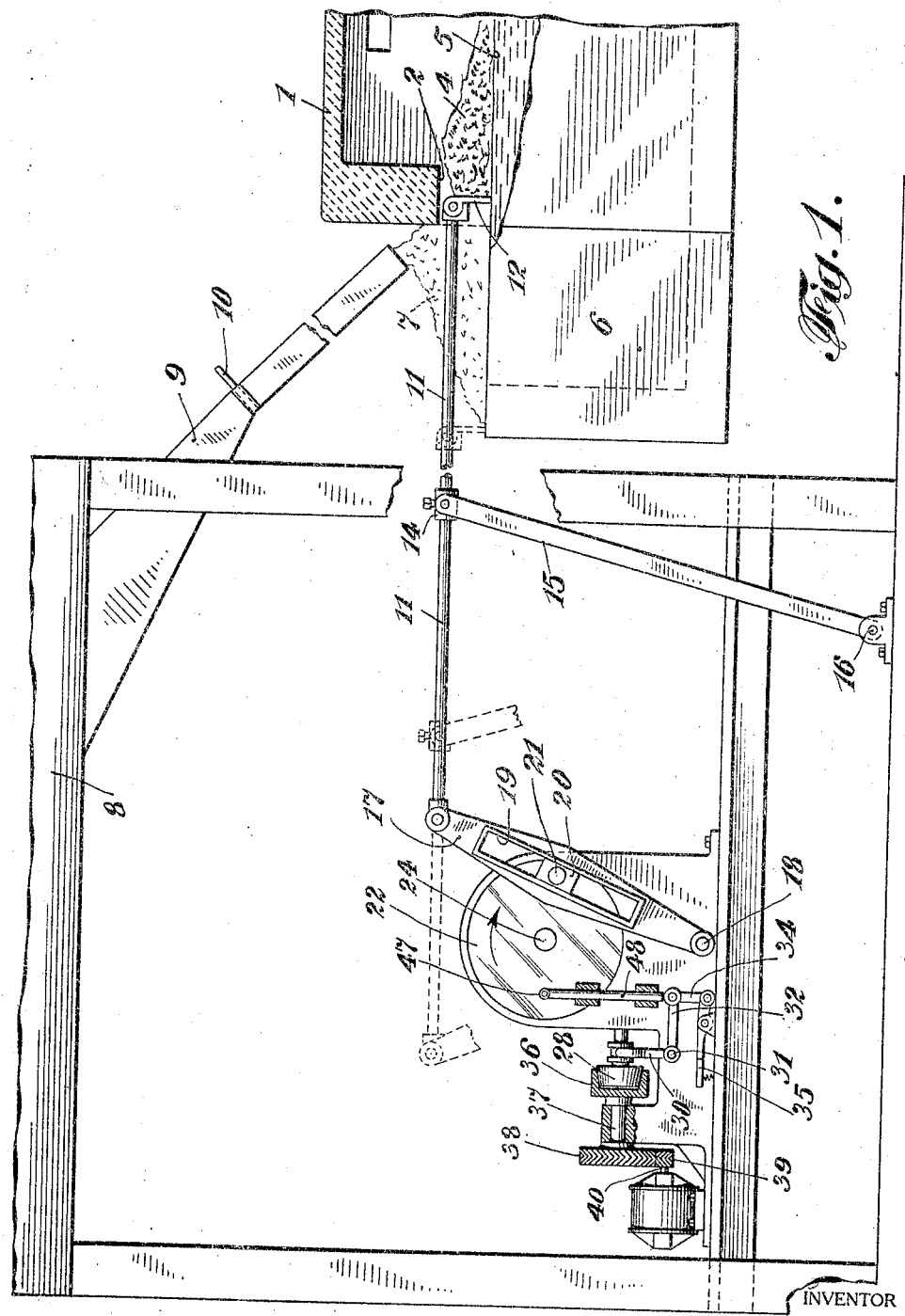
Figure 1 is a more or less diagrammatic illustration of one embodiment of the invention.

Referring now to the drawings, which more or less diagrammatically illustrate one form of the present invention, the glass furnace 1 is illustrated as showing a portion of the charging end of the melting chamber and is provided with an opening 2 through which the batch 4 is adapted to be served into the furnace on the surface of the molten glass 5.

This charging end of the furnace is provided with an extension portion 6 and is shown as containing a mass 7 of more or less unmelted material. A batch tank 8 is adapted to contain the materials necessary for the manufactured glass and is supported a sufficient height above the extension 6 to permit the batch to be fed by gravity through a suitable spout 9 to the extension near the opening 2. The rapidity of the discharge of material through the spout 9 is controlled by a suitable sliding gate 10 or the like. The material pours from the end of the spout 9 on to the mass in the extension and accumulates as a pile indicated in Figure 1 in dotted lines.

A push rod 11 carries on its forward end a scraper 12 which is pivoted in such manner as to stand substantially vertically and resist forces coming against the scraper in front of the same and in line with the axis of the push rod. The scraper may yield to forces back of the scraper so that on return movements it passes freely over any material that may have accumulated behind the scraper while it has gone forward to push the batch into the furnace. An adjustable collar 14 is mounted on the push rod and forms the pivots for the upper end of a vertical guide link 15 which is pivoted at 16 upon a suitable frame or foundation. The outer end of the push rod 11 is pivoted to the upper end of a drive arm 17 that is mounted on a shaft 18 so as to oscillate around the axis of this shaft 18. The drive arm 17 is provided with a guideway opening 19 in which a crank block 20 mounted on the crank 21 is adapted to slide. The crank 21 is secured to a crank disk 22 which is mounted on a stub shaft 24 that carries a worm wheel 25. The worm wheel is engaged by a worm 26 on the worm shaft 27. The outer end of the worm shaft carries one member 28 of a clutch which is provided with an operating arm 30 mounted on an operating shaft 31 and connected by an arm 32 and the link 34 with a pedal 35. When the pedal is depressed the parts operate to cause the clutch member 28 to engage the adjoining clutch member 36 which is secured to the stub shaft 37 that carries the gear 38 which in turn engages the pinion 39 on the motor shaft 40. As the driving mechanism operates to turn the crank disk the revolution of the disk brings the release cam 41 into engagement with the release lever 42 that is normally held in an upward position by means of the spring 44 resting on the pin 45. When the release cam 41 engages the release lever 42 it forces the lever downwardly against the resistance of the spring 44 and causes the arm 46 to rotate the operating shaft 31 in such direction as to cause the operating arm 30 to withdraw the clutch member 28 from the power driven member 36, thereby stopping the rotation of the scraper operating parts. This operation occurs after the crank disk has made one complete turn providing the release lever is in the path of the cam 41. A handle 47 is mounted on the upper end of a push rod 48 which is directly over the arm 32, so that a downward pressure on the handle 47 will cause the push rod to engage the arm 32 and release the clutch at any time whenever the operator desires to quickly stop the operations without stopping the motor.

After a suitable amount of batch has accumulated on the extension of the furnace, the operator presses downwardly the operating pedal, thereby engaging the clutch with the driving stub shaft and thereby causing the drive mechanism to rotate the crank block 20 upwardly in the guideway 19 and this carries the crank block toward the upper end of the driving arm 17 and away from the pivot shaft 18 on which the arm 17 is mounted. The forward speed movement thus imparted to the push rod 11 diminishes as the block 20 moves further away from the pivot 18 with the corresponding effective increase in transmission of power to the scraper. The rotation continues and carries the crank block to the extreme forward position which is slightly below a horizontal line through the axis of the shaft 24. During this forward movement the push rod 11 has moved from outward position to extreme inward position and has carried the scraper 12 forwardly, thereby pushing the accumulative pile of batch through the opening 2 into the glass furnace 1. The general direction of the movement of the scraper has been an inward and downward movement through the first half thereof and an inward and upward movement to the latter half so that the path of the bottom of the scraper has been substantially that of the curve X in Fig. 5, when the parts are set as illustrated. This is brought about by the fact that the guide link 15 is considerably longer than the driving arm 17 and the arc of movement therefore of the link 15 is less curved than the arc of movement of the upper end of the driving arm. The character of the path of movement of the scraper may be changed by sliding the adjustable collar 14 toward or away from the outer end of the push rod. If the collar 14 is adjusted so that the idler link 15 stands vertical when the actuating arm is in its extreme inner position, that is, nearest to the tank, the scraper will take a path extending in an inward and upward direction. If the collar 14 is adjusted so that the idler link 15 stands vertical when the actuating arm is in its extreme outer position, then the path of movement of the scraper will be downward and inward, and any adjustments of the collar 14 between these two positions will change the movement of the scraper between the two extreme limits. This movement is an important one because it produces the desirable action on the surface of the glass in pushing the batch forward and into the furnace. As the crank 20 continues to rotate from the extreme inward position to the extreme outward position, it carries the crank block downwardly toward the pivot shaft 18, thereby increasing the velocity of movement of the upper end of the drive arm and diminishes the effective power on the push rod. This all occurs on the return stroke movement of the push rod and scraper when substantially no work is being done by the scraper. From the foregoing it will appear that the push rod is moved inwardly slowly under the most effective power transmission part of the cycle, and that it is moved outwardly quickly under the least effective power movement of the cycle and at which time very little work is being done by the mechanism. Because of the hinged construction of the scraper on its outward movement, it rides over any material which may have accumulated upon the furnace extension during the forward stroke.

Where it is desirable to have the device operate continuously, the release lever 42 which is mounted on the shaft 49 may be moved sidewise by pulling on the handle 50 causing the spring latch 51 to snap from the groove 52 into the groove 54 and thereby hold the release lever out of the path of movement of the release cam 41. When this is done, the machine will continue to operate until the clutch is opened by restoration of the release lever to normal position or by operating the release handle 47 to push downwardly the release rod 48. When the machine is operated continuously the gate 10 is set to cause the proper amount of batch to be continuously discharged and the scraper intermittently feeds the accumulation into the furnace. With the parts properly adjusted so that the feed of batch into the furnace corresponds to the material being melted in the furnace and used from the outlet end thereof, the entire mechanism may operate without the intervention of an operator.

From the foregoing it will be observed that substantially constant conditions may be maintained which completely obviate the necessity of using manual labor to serve a continuous glass furnace as has been the practice heretofore.

Having thus described my invention, what I claim is:

1. A device of the character described comprising in combination a glass furnace or the like provided with a charging opening, a scraper mounted for longitudinal movement adjacent said opening, means for imparting to said scraper a reciprocating movement in a predetermined curved path to push material through said opening into said furnace and means to vary the path through which said scraper moves during its scraping movement.

2. A device of the class described comprising in combination a push rod, an operative head on said push rod, a pivoted drive arm operatively connected with said push rod, rotating crank means operatively connected with said drive arm to cause said arm to oscillate on its pivot with a rapid motion in one direction and a slow motion in the opposite direction, and guiding means to cause said head to move in a predetermined curved path.

3. In a device of the character described, a push rod, a drive arm connected to one end of said push rod, a scraper head on the other end of said push rod and adapted to perform a scraping operation, an adjustable guide means for changing the path of movement of said scraper during the scraping operation, and means for driving said drive arm.

4. A device of the character described, comprising a push rod, a scraper head on the inner end of said push rod, an oscillating driving arm connected to the outer end of said push rod, a guide link of a different length from said guide arm, adjustable means connecting said guide link with said push arm whereby the point of connection may be adjusted longitudinally on said push rod to vary the angle between the longitudinal axes of said link and said arm and thereby vary the path of movement of the scraper head, and means to cause said driving arm to oscillate.

5. A device of the character described, comprising in combination a pusher rod, a pusher head upon said pusher rod, supporting links of unequal length for guiding said pusher rod, means for adjusting the relation between said links and said rod to vary the path of movement of the pusher head, and devices to cause said pusher rod to reciprocate to and fro.

6. A furnace feed device comprising a scraper, actuating mechanism to move said scraper to and fro, means to set said actuating mechanism in operation to move said scraper, and means to automatically interrupt the movement of said scraper after a predetermined amount of movement.

7. A furnace feed device comprising a scraper, actuating mechanism to move said scraper cyclically to and fro, means to set said actuating mechanism in operation, and means to automatically interrupt the operation of said scraper after a predetermined number of cycles of movement.

8. A furnace feed device comprising a scraper, actuating mechanism to move said scraper to and fro, means to set said actuating mechanism in operation, means to automatically terminate the actuation of said scraper, and means to render said terminating means inoperative.

9. A furnace feed device comprising a scraper, means comprising a rotating member to actuate said scraper, means to set said rotating member in operation, means to terminate the operation of said rotating member, and means carried by said rotating member to actuate said terminating means and thereby automatically interrupt the operation of said scraper.

10. A furnace feed device comprising a scraper, means comprising a rotation member to actuate said scraper, means to set said rotating member in operation, means to terminate the operation of said rotating member, a cam portion carried by said rotating member, and a mechanical link, said link having an operative position in which it is engaged by said cam member to actuate said terminating mechanism and having a non-operative position in which it is not engaged by said cam member.

11. A furnace feed device comprising means movable to and fro to advance charging material to a glass furnace or the like, means to actuate said charge advancing means, and means to automatically render said actuating means inoperative.

WILLIAM McNAMARA.